Oct. 3, 1939.       L. W. BARNES       2,174,866
CHUCK
Filed June 3, 1937
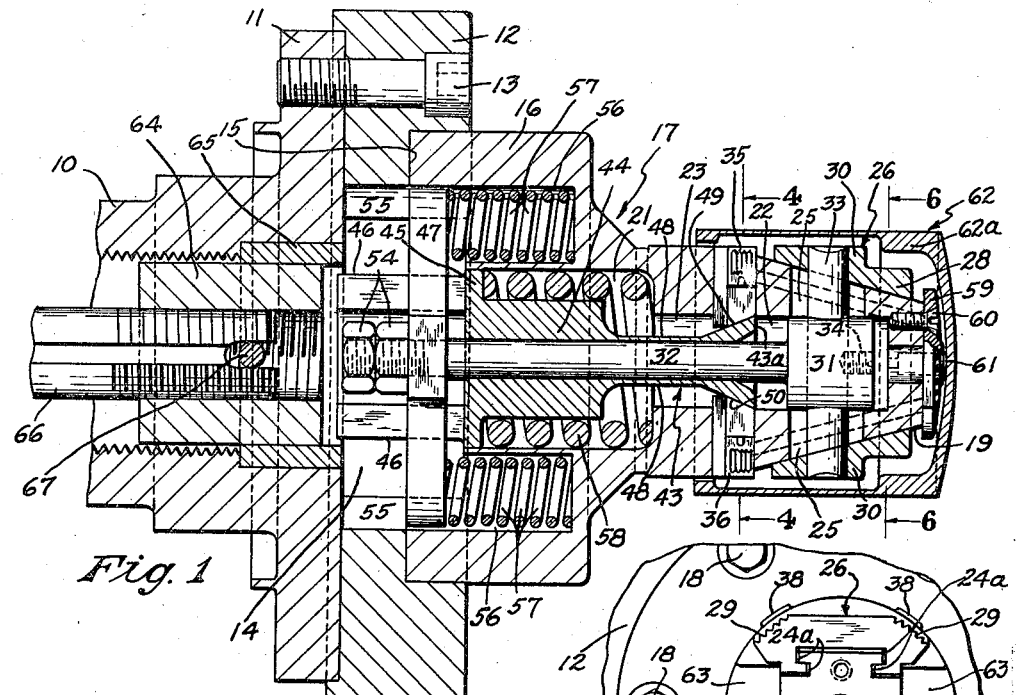
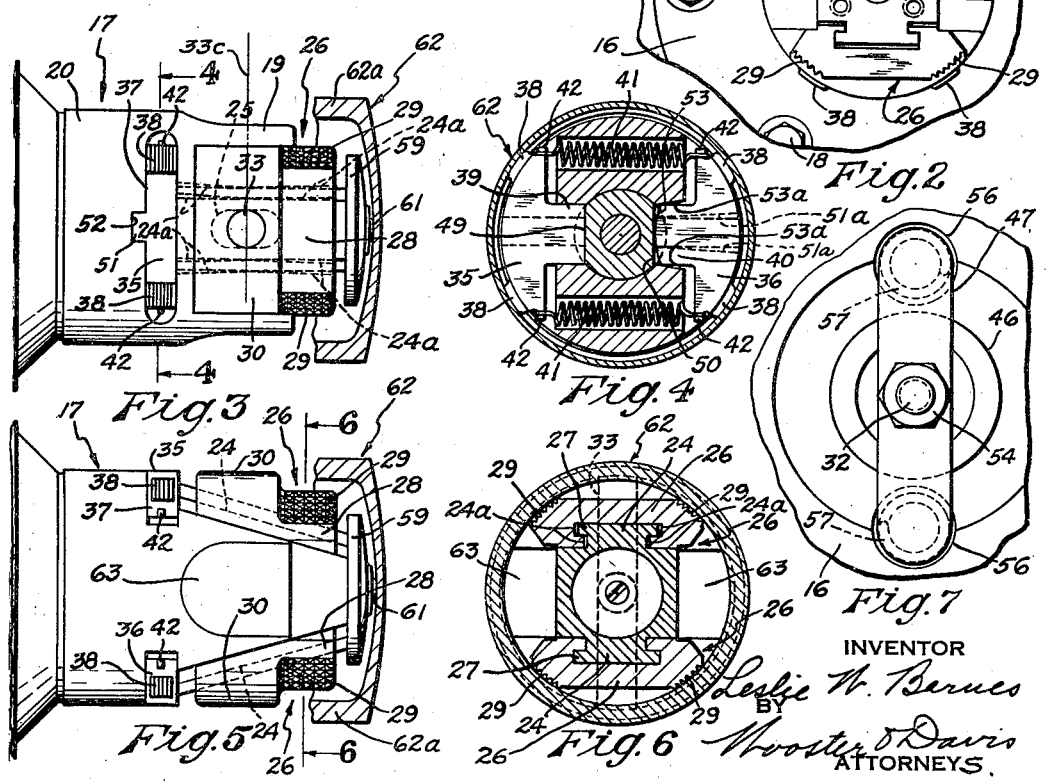
INVENTOR
Leslie W. Barnes
BY Wooster & Davis
ATTORNEYS Patented Oct. 3, 1939

2,174,866

UNITED STATES PATENT OFFICE 2,174,866

CHUCK

Leslie W. Barnes, Long Hill, Conn., assignor to The Baird Machine Company, Bridgeport, Conn., a corporation of Connecticut Application June 3, 1937, Serial No. 146,161

10 Claims. (Cl. 279—2)

This invention relates to new and useful improvements in chucks, and has particular relation to a chuck adapted to be expanded in a piece of work to support the same while being acted on by a tool.

An object of the invention is to provide an expansible chuck primarily adapted for the holding of pistons for internal combustion engines, and including means whereby the piston or similar article of work is yieldingly gripped by separate sets of jaws.

Another object is to provide a chuck including gripping means or jaws acting not only to hold or support a piece of work but also to draw it into a definite position on the chuck.

A further object is to provide a chuck including compensating means whereby the chuck is adapted to grip and securely hold an article having a rough or uneven surface to be gripped.

Other objects and advantages will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 1 is a central longitudinal sectional view through the chuck, one set of gripping jaws being shown in elevation and a piston being shown in section on the chuck;

Fig. 2 is an end view of the chuck taken as looking from the right in Fig. 1 but with the piston and the front plate or rest button of the chuck omitted;

Fig. 3 is a plan view of the forward portion of the nose piece together with the gripping jaws of the chuck;

Fig. 4 is a transverse sectional view substantially along the lines 4—4 of Figs. 1 and 3, the view being turned through an angle of 90 degrees with respect to Fig. 1;

Fig. 5 is a view similar to but at right angles to Fig. 3, or looking toward the bottom of this figure;

Fig. 6 is a sectional view substantially along the lines 6—6 of Figs. 1 and 5; and Fig. 7 is a view taken as looking into the inner or rear end of the nose piece of the chuck.

Referring in detail to the drawing, at 10 is shown the forward portion of a tubular driving member or shaft including a flange or plate-like portion 11 to which an annular disc-like chuck body 12 is securely fastened, as by machine screws 13. Body 12 has an opening 14 therethrough, and in its outer face about said opening is provided with an annular recess 15 receiving the inner end portion 16 of a nose piece 17. By means of screws or the like 18 the nose piece 17 is rigidly secured to the body 12.

In addition to the rear portion 16 the nose piece includes a forward portion 19 of smaller diameter and an intermediate or connecting portion 20, the said portions being provided with communicating recesses 21, 22 and 23 respectively. Nose piece portion 19 on a pair of opposite sides is provided with undercut guides 24 inclining outwardly and backwardly from the forward end of the piece. The portion 19 is provided with slots 25 communicating with its recess 22 and opening through the guides 24.

On each guide 24 is a gripping jaw 26 provided in its inner or under side with an undercut channel or groove 27 receiving its guide 24 whereby the jaws are slidable along the guides. Each jaw comprises a forward portion 28 provided at spaced points with gripping teeth or roughened surfaces 29, and also comprises a rear portion 30, the said portions 28 and 30 being integral. Owing to the fact that the jaws 26 move on the inclined guides 24 it will be apparent that as the jaws are moved toward the forward end of the nose piece the jaws will be drawn in toward one another or to released positions, whereas when the jaws are moved in the opposite direction they are caused to spread apart to gripping positions.

Within the portion 19 is a head 31 attached to or formed integral with a rod 32 extending longitudinally of the nose piece through the recesses 23 and 21. A pin 33 extends through the head 31 and is secured thereto, as by a set screw or the like 34, and such pin passing through the slots 25 enters the portions 30 of the jaws 26 whereby the latter are attached to the head 31 to move therewith, as will appear, the pin 33 having a sliding fit in the jaws.

The guideway in one of the jaws 26, in the present drawing the upper jaw, is tapered outwardly a small amount in opposite directions longitudinally from the center line 33c of pin 33 as shown at 24a in Figs. 2, 3 and 6 so that the jaw may rock laterally so as to seat its gripping surface 29 properly against the interior unfinished surface of the work, in this case the piston 62.

Mounted in the portion 19 rearwardly of the jaws 26 are jaws 35 and 36 arranged in slots 37 for radial movement toward and from gripping positions. Jaws 35 and 36 are opposite one another and each includes spaced work engaging teeth or roughened surfaces 38, and the jaws include extensions 39 and 40 respectively the inner or opposed ends of which enter into the recess 22 inwardly of the head 31. Coil springs 41 are connected at their respective ends with lugs 42 on the jaws 35 and 36 and constantly tend to shift said jaws to their inner or released positions.

Slidable on the rod 32 is a cam sleeve generally designated 43 and including a portion 44 of large diameter at the inner end of which is a flange-like portion 45 carrying inwardly or horizontally projecting transversely arcuate pieces 46 spaced apart to receive between them an elongated plate or bar 47 later to be fully described. Cam sleeve 43 is flattened on both sides at 48 providing at its forward end a pair of diverging cam surfaces 49 and 50 adapted to engage respectively the inner ends of the extensions 39 and 40 of the jaws 35 and 36.

Such jaws are each provided with a guide rib 51 slidable in a suitable channel 52 in the nose piece, and the inner end of extension 40 is arcuate as at 53. Further the rib 51 of jaw 36 has a slight clearance in its channel which flares toward its outer end as shown at 51a in Fig. 4 and there is also, as shown in the same figure, a clearance at each edge of said extension as at 53a whereby the jaw 36 may have a slight rocking movement. This construction enables the jaw to accommodate itself to and properly seat on an irregular surface to be gripped, and also to accommodate itself to variations in the surfaces of different articles.

The bar 47 is on the rod 32 and is held thereon, as by nuts 54, and such bar extending through the space or slot between the cam sleeve portions or extension 46 has its outer ends guided in grooves 55 in the inner edge of the opening 14 through the body 12. Thus the bar is held against turning movement in the nose piece, and the bar in turn assists in holding the cam sleeve 43 against any turning movement in the nose piece.

Portion 16 of the nose piece is provided with recesses or pockets 56 receiving coil springs 57 bearing at one end against the inner ends of such pockets and at their other ends against the end portions of the bar 47. With this construction it will be clear that the springs 57 constantly tend to shift the bar 47 and draw on the rod 32 to move it to the left as viewed in Fig. 1, or in a direction to cause the jaws 26 to move upwardly on the inclined guides 24 whereby to expand said jaws to their gripping positions.

Within the recess 21 and disposed about the enlarged portion 44 of the cam sleeve is a heavy coil spring 58 bearing at one end against the inner wall of such recess and at its other end against the flange-like portion 45 of the cam sleeve 43. This spring constantly tends to move the cam sleeve to the left as viewed in Fig. 1, or in a direction to have its cam surfaces 49 and 50 act on the inner ends of the jaw extensions 39 and 40 in a manner to force the jaws 35 and 36 outwardly or radially with respect to the nose piece, whereby to have such jaws assume their gripping positions.

An end plate or rest button 59 is secured on the forward end of the nose piece, as by screws 60, and the same may have a central forwardly projecting part 61 forming a stop against which the inner side of the head of a piston or other piece of work 62 may be brought to fix the position of the work on the chuck. Also, in its opposite sides the portion 19 is cut away or recessed as at 63 (Figs. 2, 5 and 6) to provide clearance for the wrist pin bosses of the piston.

Within the member or shaft 10 is an operating sleeve 64 slidable through a bearing 65. A push rod 66 operated at predetermined times, as by a cam or other means (not shown), is threaded into the sleeve 64 and after the proper adjustments have been made is secured in fixed position, as by a cross or tie pin 67 attaching it to the sleeve 64 in such manner that there can be no relative movement between them.

Assuming that the piston 62 is being held on the chuck and that the work on this piston has been completed, the operation is as follows. Push rod 66 is moved forwardly and causes the operating sleeve 64 to engage the ends of the extensions 46 of the cam sleeve 43 and to then move the cam sleeve forwardly. As this occurs the spring 58 is compressed and the cam faces 49 and 50 are moved to the right as viewed in Fig. 1, permitting the jaw extensions 39 and 40 to slide down these cam surfaces and the springs 41 to draw the jaws 35 and 36 inwardly to release the work.

As the forward movement of the cam sleeve 43 continues the forward end 43a of the latter engages the head 31, which forms a shoulder on the rod 32, shifting the head forwardly or to the right, causing compression of the springs 57 and carrying the jaws 26 forwardly so that they move down the inclined guides 24 to released positions and to release the work. Now the jaws of both sets being in released positions the piston 62 or other work may be removed from the chuck and a new piece of work placed thereon. The piston is moved onto the chuck until the inner surface of the head of the piston engages the stop or limiting pin 61.

Now the push rod and the operating sleeve 64 start in the opposite direction or to the left, and as the forward end 43a of the cam sleeve 43 is shifted in a direction away from the head 31 the springs 57, acting against the bar 47 and through the rod 32, draw the head 31 inwardly or to the left so that it follows the cam sleeve and moves the jaws 26 upwardly along the inclined guides 24, so that said jaws move outwardly to expanded or gripping positions. As the jaws 26 move radially to gripping positions they also move inwardly with respect to the forward end of the nose piece, or that is to the left as viewed in Fig. 1. Therefore as the jaws come against and grip the work they tend to draw it inwardly over the chuck bringing the inner surface of the head of the piston against the button 61, whereby the piston is accurately positioned on the chuck and held in this position. Also, pressure of the cutting tool on outside of work piece tends to force this casting (work piece) on to the jaws which naturally tends to loosen the grip, but the action of springs 57 is to urge the rod 32 and block 31 backwardly automatically forcing the two front jaws 26 outwardly and backwardly, thus maintaining the grip on the casting, which holds the casting up against the end stop 61 and as both jaws move back together maintains the casting centrally on the chuck.

After the jaws 26 grip the piston, the rod 66, sleeve 64 and cam sleeve 43 continue their inward movement, the latter under the urging of the spring 58, whereby the cam surfaces 49 and 50 of the sleeve 43 engage the inner ends of the jaw extensions 39 and 40 forcing the jaws 35 and 36 outwardly against the action of the relatively light springs 41. Immediately after the operating sleeve 64 leaves the ends of the portions 46 of the cam sleeve all jaws of the chuck are in their gripping positions and are held there by the springs 57 and 58.

From the foregoing it will be clear that when a new piece of work is placed on the chuck the work is first gripped by the jaws 26 and that thereafter it is gripped by the jaws 35 and 36, and that when the work is to be removed from the chuck the jaws 35 and 36 are first released and then the jaws 26 are released. The jaws 26 grip the head of the piston where there is a substantial amount of stock as indicated at 62a but the jaws 35 and 36 grip the piston skirt portion where the stock is relatively thin. All gripping and releasing is done automatically and the jaws are held in gripping positions by spring pressure.

The inner surface of the piston is rough or unfinished, being a casting, and the separate sets of jaws are provided and operated separately to assure gripping of the piston in a manner to hold it true. It will be seen the piston is held adjacent its opposite ends by the two sets of jaws. Since the jaws are held in gripping position by spring pressure they can accommodate themselves to variations in the surface to be gripped so that the piston will be properly gripped in both its head and its skirt portions. Because of the construction above described the jaw 36 is capable of a certain limited rocking movement to accommodate itself to irregularities in the surface of the skirt portion of a piston.

Having thus set forth the nature of my invention, what I claim is:

1. In a chuck, a nose piece, sets of gripping jaws on said nose piece with one set spaced forwardly of the other in a direction longitudinally of the axis of the nose piece, independent spring means for moving said jaws to gripping positions, and means whereby the forward of said sets of jaws is moved to positions gripping the work prior to the other set.

2. In a chuck, a nose piece, sets of jaws on said nose piece, means whereby the respective sets of jaws are moved to grip the work in succession and to release the work in reverse order to that in which they are moved to grip the work.

3. In a chuck, a nose piece, a set of jaws on said nose piece and movable in a manner to grip a piece of work and tending to draw said piece of work onto the nose piece, means to move said jaws, a second set of jaws on the nose piece, and other means to move said second set of jaws after the first set of jaws have gripped the work to have said second set of jaws then grip the work.

4. In a chuck, a nose piece, a pair of sets of jaws on said nose piece spaced longitudinally thereof, spring means to move the jaws of one set to gripping positions, and other spring means to move the jaws of the other set to gripping positions, and means controlling the operation of said spring means to cause one set of jaws to grip the work before the other.

5. In a chuck, a nose piece, a pair of inclined guides on said nose piece, a jaw on each of said guides, means for moving said jaws on said guides to and from gripping positions, a second set of jaws on said nose piece, spring means constantly tending to keep said second set of jaws in released positions, a cam shiftable to move said second set of jaws to gripping positions, and means to operate said cam in succession with the operating means for the first jaws.

6. In a chuck, a nose piece, a pair of inclined guides on said nose piece, a jaw on each of said guides, spring means for sliding said jaws on said guides to bring them to gripping positions, a second set of jaws on said nose piece, spring means constantly tending to keep said second set of jaws in released positions, a cam shiftable to move said second set of jaws to gripping positions, spring means to operate said cam, and means controlling operation of said first and last mentioned spring means arranged to permit said cam operating means to shift the second set of jaws to grip a piece of work after the first set.

7. In a chuck, a nose piece, gripping jaws on the forward portion of said nose piece, a rod extending longitudinally of said nose piece into its forward portion, means connecting said rod with a pair of said jaws, spring means in said forward portion of the nose piece and constantly tending to maintain a second pair of said jaws in released positions, a cam sleeve about said rod and shiftable longitudinally with respect thereto, a cam on said sleeve to shift said second set of jaws to gripping positions against the action of said spring means, a spring within the rear portion of said nose piece and constantly tending to shift said cam sleeve in a direction to have said cam shift the second pair of jaws to gripping positions, and other spring means in the rear portion of said nose piece and constantly tending to shift said rod to move the first mentioned pair of jaws to gripping positions.

8. In a chuck, a nose piece, gripping jaws on the forward portion of said nose piece, a rod extending longitudinally of and into the forward end of said nose piece, means connecting said rod with a pair of said jaws, spring means in said forward portion of the nose piece and constantly tending to maintain a second pair of said jaws in released positions, a cam sleeve about said rod and shiftable longitudinally with respect thereto, a cam on said sleeve to shift said second set of jaws to gripping positions against the action of said spring means, a spring within the rear portion of said nose piece and constantly tending to shift said cam sleeve in a direction to have said cam shift the second pair of jaws to gripping positions, another spring in the rear portion of said nose piece and constantly tending to shift said rod to move the first mentioned pair of jaws to gripping positions, means to shift said cam sleeve in the opposite direction to move said cam and permit the second mentioned jaws to move to released positions, and means on said rod engageable by said cam sleeve on further movement thereof in the same direction whereby on such further movement the rod is shifted to move the first pair of jaws to released positions.

9. In a chuck, a nose piece, jaws on said nose piece and slidable toward and from the outer end thereof, means for sliding said jaws, guides on said nose piece inclining from the outer end thereof and on which said jaws slide whereby as said jaws are slid inwardly on the nose piece they are expanded to grip an article and draw it inwardly over the nose piece, a second set of jaws inwardly of the first jaws, guides on said nose piece to give said second jaws substantially radial movement only, operating means for the second jaws, and control means for the jaw operating means to cause the first set of jaws to grip the work before the second set.

10. In a chuck, a nose piece, jaws on said nose piece and slidable toward and from the outer end thereof, spring means constantly tending to slide said jaws inwardly from the outer end of the nose piece, guides on said nose piece inclining from the outer end thereof and on which said jaws slide whereby as said jaws are slid inwardly on the nose piece they are expanded to grip an article and draw it inwardly over the nose piece, a second set of jaws inwardly of the first jaws mounted for substantially radial movement only, other spring means to move the jaws of the second set to gripping positions, and means controlling the operation of said spring means to cause the first set of jaws to grip the work before the other set.

LESLIE W. BARNES.